F. F. HALL.
THERMOSTATIC REGULATOR FOR HEATING APPARATUS.
APPLICATION FILED FEB. 28, 1913.
1,209,432.
Patented Dec. 19, 1916.
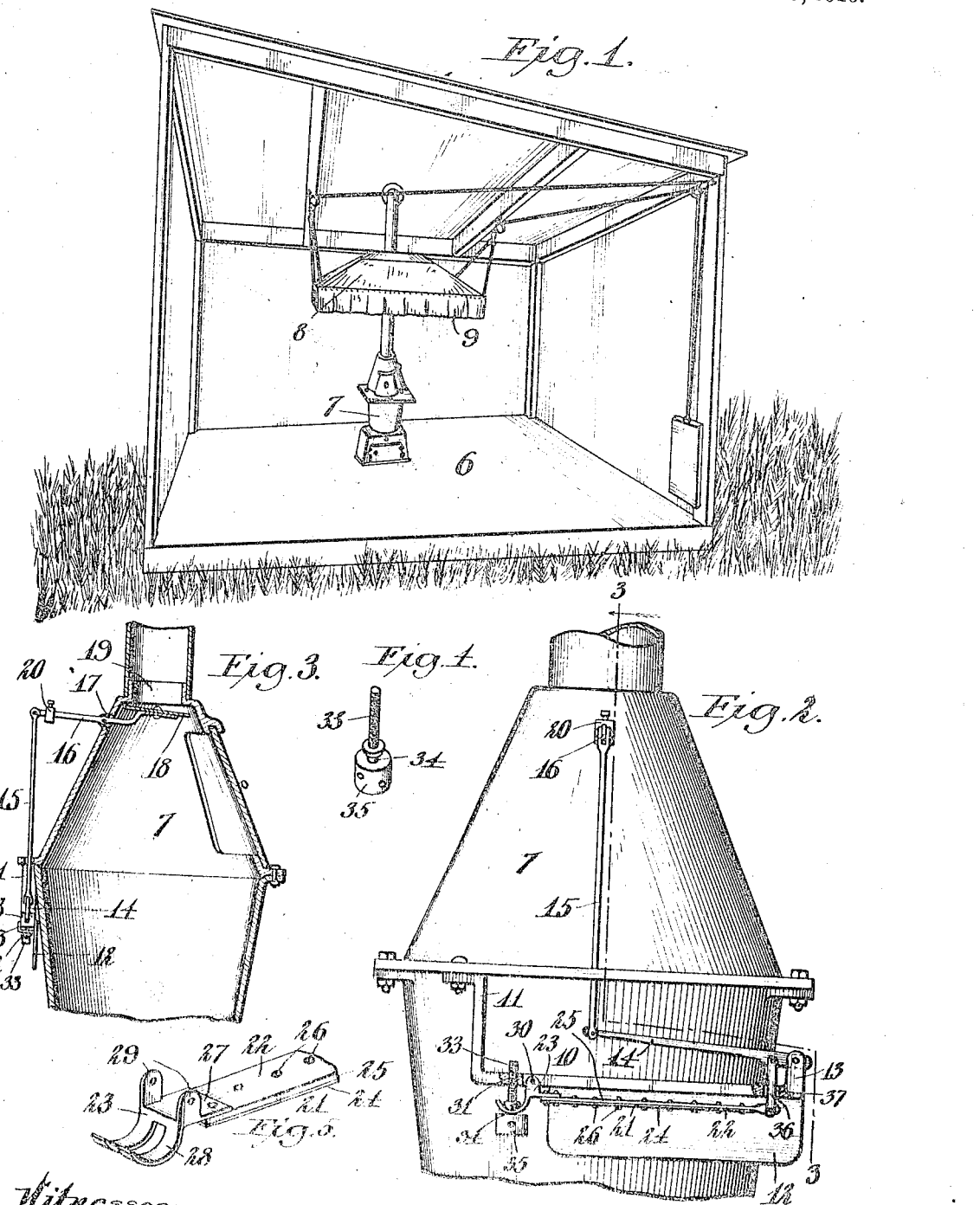

UNITED STATES PATENT OFFICE.

FRANK F. HALL, OF LITTLE FALLS, NEW YORK.

THERMOSTATIC REGULATOR FOR HEATING APPARATUS.

1,209,432.  Specification of Letters Patent.  Patented Dec. 19, 1916.

Application filed February 23, 1913. Serial No. 751,231.

*To all whom it may concern:*

Be it known that I, FRANK F. HALL, a citizen of the United States, and resident of Little Falls, in the county of Herkimer and State of New York, did invent certain new and useful Improvements in Thermostatic Regulators for Heating Apparatus, of which the following is a specification.

My invention relates to thermostatic regulators for heating apparatus, and it has for its primary object, the provision of a device of this character which is simple and of inexpensive construction and one which is very sensitive and therefore quick in action under changing temperature.

Another object of my invention is the provision of simple and effective adjusting means whereby the regulator may be adjusted to maintain any desired degree of heat.

Another object of my invention is the production of a regulating device which, while adaptable for regulating the heat in various forms of stoves or heaters, is particularly designed as an equipment of heaters for poultry brooding.

With these and other objects in view to appear hereinafter, my invention consists in a regulator having a controlling member consisting of metals of different expanding properties under heat, improved means of supporting said member and connecting the same to a regulating damper or other similar device of a heater or the like, and improved means of assisting or resisting the action of the heat on said member so as to adjust the latter to maintain any desired degree of heat.

My invention further consists in the novel features of construction and in the arrangement and combination of parts to be hereinafter described and particularly pointed out in the subjoined claims.

In the drawings,—Figure 1 is an interior perspective view of a colony house in which is shown a colony brooder for chicks, for the heater of which my improved regulator is particularly designed. Fig. 2 is a rear elevation of the upper portion of the heater shown in Fig. 1, the same being equipped with my improved regulator. Fig. 3 is a vertical section taken on line 3—3, Fig. 2, reduced in scale. Fig. 4 is a detached perspective view of the adjusting screw whereby the action of the heat on the controlling member is assisted or resisted. Fig. 5 is a detached perspective view of the pivoted adjusting end of the controlling member.

Like numerals of reference refer to like parts in the several figures of the drawings.

The reference numeral 6 designates a colony brooder house in which is located a colony brooder comprising a heater 7, such as is to be equipped with my improved regulator and a hover 8 which may be raised or lowered and when lowered completely incloses the heater. This hover when lowered has its curtain or hover flaps 9 in contact with the floor so that in entering or leaving the hover, the chicks force a flap or flaps out of normal position, which however, they immediately resume after a chick passes out of contact therewith, thus retaining the heat of the heater within the hover. It is the purpose of my invention to maintain the heat within the hover at any desired even temperature, in a simple, inexpensive and effectual manner, and while the parts just described form no part of my invention, it is believed the purpose and objects of the same will be more readily understood by illustating and briefly describing such parts. It will, however, be understood from the description to follow that my improved regulator may be applied to various kinds and forms of heaters and to heaters used for various purposes.

My improved regulator considered as a whole is designated 10 and comprising a supporting frame or member 11 suitably fastened to the heater 7 and provided with an apron 12 serving as a shield for the controlling member of the regulator to be presently described. Said shield occupies a position between said controlling member and the heater and the frame 11 from which said shield depends has at one end a bifurcated upstanding lug 13 in the bifurcation of which is pivotally secured one end of an operating lever 14 which has pivotally secured to its other end the lower end of an operating rod 15. The upper end of this rod is secured to a damper lever 16 extending into the heater through an opening 17 therein and pivotally secured at or near said opening. Said damper lever is therefore pivotally secured between its ends and has part within and part without the heater. To the inner end of said damper lever is secured a damper 18 which closes entirely or to any extent desired the draft opening 19 in the heater, thus checking the fire as may be desired. A weight 20 may be adjustably secured to the part of the damper lever without the heater, its purpose being to equalize the weight of the damper 18 and thus render the regulator more sensitive. By adjusting this weight the sensitiveness of the regulator may be controlled.

Secured to the supporting frame 11 is the controlling member hereinbefore referred to, said member being designated 21, and comprising a regulator bar 22 and a fulcrum head 23 to which said bar is riveted or otherwise secured. Said regulator bar is formed of two strips of metal 24, 25, of different expanding properties, which strips lie in contact and are riveted together, as at 26, or otherwise suitably connected. The fulcrum head 23 may be cast or otherwise fashioned to provide a flat portion 27 for connection to said portion and a bifurcated segmental portion 28 and a pair of upstanding ears 29 between which is received the supporting frame 11, said ears being pivotally secured to said frame, as at 30.

In the supporting frame 11 directly above the segmental portion of the fulcrum head 23 is a tapped aperture 31 into which is threaded an adjusting screw 33 provided with an annular groove 34 and a suitable head 35. Said segmental portion of the fulcrum head straddles said screw and engages the annular groove therein and as this segmental portion is at one side of a plane passing through the pivot 30 of the controlling member and the regulator bar at the other, the adjusting of the screw 33 causes said bar to flex one way or the other to assist or resist the action of the heat thereagainst, consequently enabling the regulation of the heat to any desired temperature.

The heat acts to expand the metal strips constituting the regulator bar and by reason of one strip expanding more than the other, the bar becomes flexed. The movement thereof is imparted to the operating lever 14 by a link 36 pivotally connected to both and extending through an opening 37 in the supporting frame; the pivotal connection of said link to said lever being comparatively close to the fulcrum point of the latter so that slight movement of the link caused by the regulator bar will result in much greater movement of the outer end of said operating lever and consequently a considerable movement of the damper, so as to check or enliven the fire within the heater, as the case may be.

It will be plain to those skilled in the art to which this invention appertains that where the draft opening in a heater is otherwise arranged than herein shown slight modification falling fully within the scope of my invention may be resorted to; also that other changes in minor details of construction and arrangement may be resorted to without departing from my invention or sacrificing any of the advantages thereof.

The operation of this invention will be plain from the foregoing description and further illumination thereof is not believed to be necessary.

Having thus described my invention, what I claim is,—

1. In combination with a damper or the like of a heater, a regulator comprising a support having a shield extending therefrom, a regulator bar formed of metals of different expanding quality secured together throughout their length, said shield being situated between said regulator bar and said heater, a fulcrum head secured to said regulator bar and having a bifurcated portion, an adjusting screw engaging said bifurcated portion and threaded into said support, and connection between the opposite end of said regulator bar and the damper.

2. In combination with a damper or the like of a heater, a regulator comprising a support secured to the heater and having a depending shield, a regulator bar lying in front of said shield, a fulcrum head secured to one end of said regulator bar having a pair of upstanding ears straddling said support and being pivotally connected therewith and a bifurcated segmental portion, an adjusting screw straddled by said bifurcated segmental portion and adjustably engaging into said support, and operative connection between the opposite end of said regulator bar and the damper.

3. In combination with a damper or the like of a heater, a regulator comprising a support secured to the heater and having an opening therethrough and an upstanding lug, a regulator bar formed of metals of different expanding qualities secured together and having one end adjustably secured to said support, a link pivotally secured to the opposite end of said regulator bar and extending upwardly through the opening in said support, an operating lever pivotally secured to the upstanding lug of said support to which the opposite end of said link is pivotally secured, and an operating connection between said lever and the damper.

4. In combination with a damper or the like of a heater, a regulator comprising a support secured to the heater and having a depending shield, an opening in the support near one end and an upstanding lug, a regulator bar underneath said support and outside of said shield, said regulator bar having one end adjustably secured to said support, an operating lever pivotally secured at one end to said upstanding lug, a link passing through the opening in said support and having one end pivotally secured to the free end of said regulator bar and its other end pivotally secured to said operating lever near its connection with said lug, an operating rod pivotally secured to the free end of said operating lever in operative connection between said rod and the damper.

5. In combination with a damper or the like of a heater, a regulator comprising a regulator bar formed of metals of different expanding qualities, a fulcrum head having a flat portion secured to one end of said regulator bar and provided with a lug for pivotally securing said head to a fixed point and also with a bifurcated segmental portion, an adjusting screw provided with an annular groove to receive the segmental portion of said fulcrum head, said adjusting screw being adapted to be threaded into a fixed object, and means of connection between said regulator bar and the damper.

In testimony whereof, I have affixed my signature in the presence of two subscribing witnesses.

FRANK F. HALL.

Witnesses:
D. A. CHAMPION,
H. A. DE COSTER.